United States Patent [19]

Vrabel et al.

[11] Patent Number: 4,678,975

[45] Date of Patent: Jul. 7, 1987

[54] MOTOR CONTROL CIRCUIT FOR MOTOR DRIVEN POWER WINDOWS

[75] Inventors: Robert J. Vrabel, Sterling Heights; Jeffery L. Vajgart, Dearborn; Lawrence E. Staszel, Dearborn Heights; Henry J. Ewald, Livonia; Norman M. Haygood, Jr., Canton; Leon M. Misewicz, Dearborn, all of Mich.

[73] Assignee: Ford Motor Company, Dearborn, Mich.

[21] Appl. No.: 816,659

[22] Filed: Jan. 6, 1986

[51] Int. Cl.[4] .......................... H02P 1/22; H02P 3/08
[52] U.S. Cl. .................................. 318/266; 318/256; 318/286; 318/445; 318/469; 318/283
[58] Field of Search ...................... 49/26, 28; 318/256, 318/264, 265, 266, 267, 282, 283, 285, 286, 466, 467, 468, 469, 470, 445, 280

[56] References Cited

U.S. PATENT DOCUMENTS

| | | | |
|---|---|---|---|
| 4,001,661 | 1/1977 | Terabayashi | 318/264 |
| 4,035,702 | 7/1977 | Pettersen et al. | 318/285 |
| 4,138,630 | 2/1979 | Graham | 318/257 |
| 4,234,836 | 11/1980 | Gaus et al. | 318/446 X |
| 4,347,465 | 8/1982 | Goertler et al. | 318/266 |
| 4,357,564 | 11/1982 | Deming et al. | 318/280 |
| 4,373,149 | 2/1983 | Coste | 318/281 |
| 4,394,605 | 7/1983 | Terazawa | 318/256 X |
| 4,394,607 | 7/1983 | Lemirande | 318/469 X |
| 4,408,146 | 10/1983 | Beckerman | 318/264 |
| 4,459,521 | 7/1984 | Barge | 318/267 |
| 4,476,416 | 10/1984 | Licafa et al. | 318/283 |
| 4,562,387 | 12/1985 | Lehnhoff | 318/265 X |
| 4,575,662 | 3/1986 | Lehnhoff | 318/282 |

*Primary Examiner*—William M. Shoop, Jr.
*Assistant Examiner*—Bentsu Ro
*Attorney, Agent, or Firm*—Paul K. Godwin, Jr.; Clifford L. Sadler

[57] ABSTRACT

A control circuit for a reversible D.C. window drive motor that allows for one touch operations of the motor to automatically lower the associated window to its full down position following a relatively short actuation of the control switch in the "DOWN" position. Subsequent actuation and release of the control switch will cause interruption and inhibit the automatic lowering of the window. Longer actuations of the control switch allows for direct movement control of the window in the downward direction. Stall current sensing and excessive time sensing provide protection to the motor and the drive circuitry.

9 Claims, 2 Drawing Figures

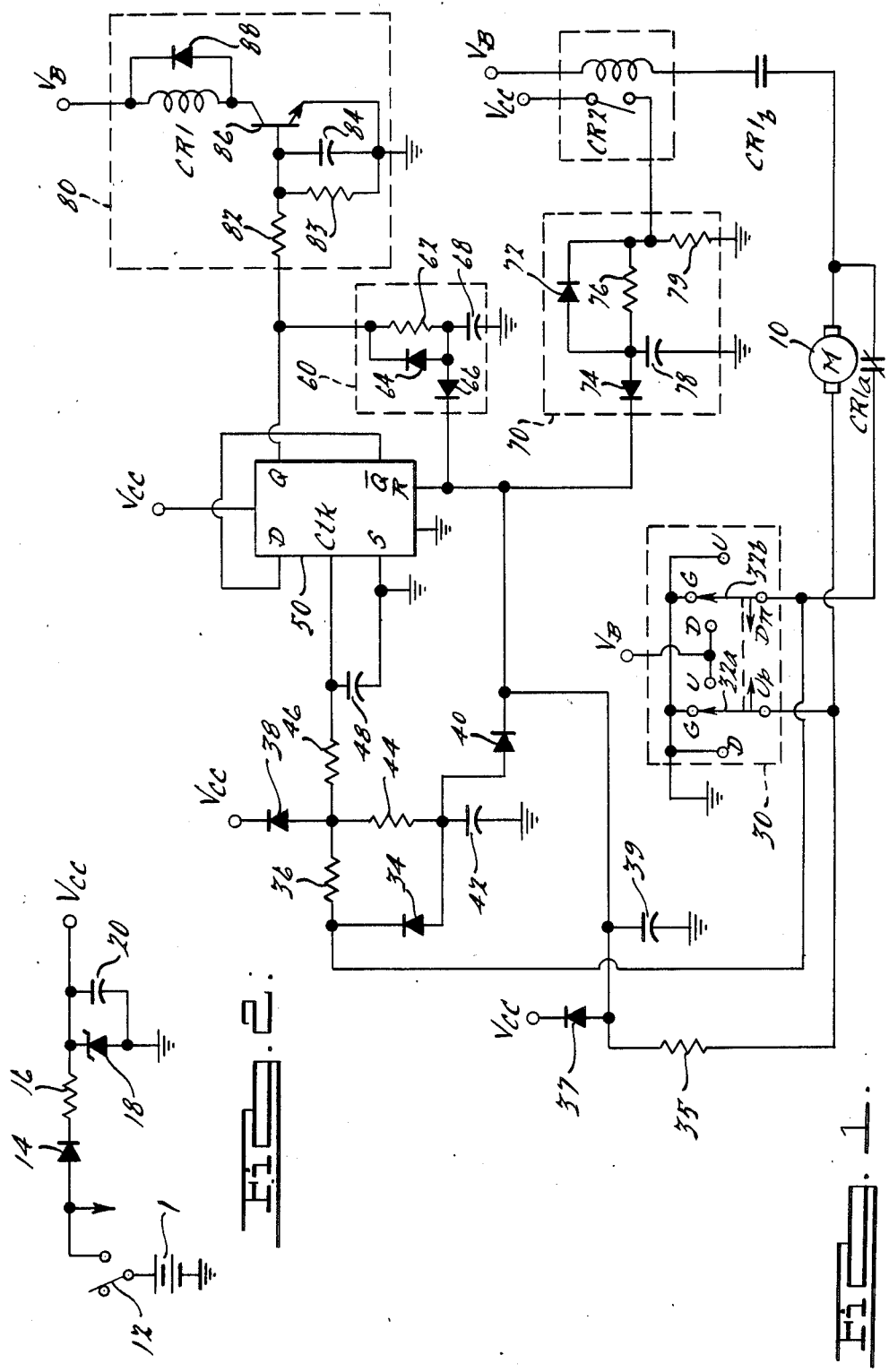

MOTOR CONTROL CIRCUIT FOR MOTOR DRIVEN POWER WINDOWS

BACKGROUND OF THE INVENTION

1. Field of the Invention

The present invention is directed to the field of circuitry for controlling the operation of bi-directional D.C. motors and more specifically to the area of such circuitry for use with power window drive motors in automotive vehicles.

2. Description of the Prior Art

Numerous prior art systems have been implemented to control the drive motors used to move windows between their fully closed and fully opened positions. In recent years, one-touch control systems have been found to be desirable, wherein a single, relatively short actuation of the control switch causes the drive motor to be continually energized. Even after the switch is returned to its unactuated position the motor is continually energized until the window reaches its fully closed or fully open condition.

In U.S. Pat. No. 4,001,661, a one-touch action type power window control system is disclosed in which the actuating control switch has conventional UP and DOWN actuating positions for conventional corresponding up/down control movement of the window. In addition, the actuation switch has two other positions designated as an "UP HOLD" and a "DOWN HOLD" position. Therefore, when the switch is actuated to an "UP HOLD" or a "DOWN HOLD" position, an appropriate relay is latched so as to continue to supply drive energy to the motor in the designated drive direction. A pick-up coil is used to sense the current flow through the motor and a circuit is connected thereto to determine when the the speed of motor rotation has dropped sufficiently to release of the latched relay.

The system in U.S. Pat. No. 4,373,149 utilizes separate flip/flop circuits connected to each side of a mechanical control switch so that actuation of the control switch to move a power window in a particular direction will cause the corresponding flip/flop circuit to assume a first state. Power to the window is thereafter continually supplied until the window is in its fully raised or lowered position, as appropriate, or until the control switch is again actuated.

In U.S. Pat. No. 4,476,416, a power window control circuit is shown, wherein the actuation switch provides for corresponding control of the motor drive circuit for short time periods corresponding to the actuation time of the switch, as long as such actuation time is below a defined first predetermined time period. If the actuation of the switch is continuously maintained for a period of time that exceeds the first predetermined time period but is less than a defined second predetermined time period, the circuit latches the motor drive. The circuit holds the latch continuously thereafter if the actuation switch is released before the expiration of the second predetermined time period. The motor is then stopped when the window reaches a predetermined position at the far end of its movement. If the actuation switch is held in one position continuously for a period of time that exceeds the second predetermined period of time, the latching circuit is deactivated so that subsequent release of the actuation switch will cause the motor to stop in its position at that particular time.

SUMMARY OF THE INVENTION

The present invention has some similarity to the above-described circuits in that it provides for a one-touch control of an actuation switch to effect continuous energization of the drive motor after the actuation switch is released. However, the present invention improves on the prior art systems by providing a control circuit which responds to a momentary actuation of the UP/DOWN switch to its DOWN position to provide a continuous energization to the drive motor to lower the associated vehicle window until either the motor reaches a stall condition or the actuation switch is again actuated and released. The circuit further provides for conventional direct movement control of the power window if the actuation switch is held in its DOWN position for a period of time longer than that defined for the limited period of momentary actuation.

Motor stall current is sensed to indicate that the motor is overloaded or has reached its movement limit and circuitry is included that deactivates the continuous energization feature when stall current is detected as occurring for a defined time period.

A stall time circuit is included which monitors the time that the motor is energized and causes deenergization when that period exceeds the expected period of time it takes the window to move from one extreme position to the opposite extreme position defined by the window being fully opened and fully closed. The stall timer circuit is effective to provide additional protection, in the event the stall sensor device fails.

BRIEF DESCRIPTION OF THE DRAWINGS

FIG. 1 is a circuit diagram illustrating the preferred embodiment of the present invention.

FIG. 2 is a circuit diagram of a voltage regulator circuit that is used in conjunction with the circuit shown in FIG. 1.

DESCRIPTION OF THE PREFERRED EMBODIMENT

In FIG. 1, a bidirectional D.C. motor 10 is shown connected to a source of D.C. potential $V_B$ and ground, through $CR1_b$ relay contacts and a control switch 30.

The source of D.C. potential $V_B$ is derived from a storage battery 1 via an "ON-OFF" switch 12, that is shown in FIG. 2. A rectifying diode 14, a dropping resistor 16, a Zener diode 18 and bypass capacitor 20 form the regulator circuit to provide the regulated circuit voltage $V_{cc}$ to the various solid state elements utilized in the circuit.

The control switch 30 is a double pole switch containing a single manual actuator in which wiper poles $32a$ and $32b$ are ganged to be moveable from an unactuated "G" position to either a "U" (UP) position or a "D" (DOWN) position.

When actuated to the DOWN position, the control switch 30 provides a voltage $V_B$ on wiper pole $32b$ and a ground potential on wiper pole $32a$. When released, the wiper poles $32a$ and $32b$ return to their "G" positions and are both grounded. When actuated to the UP position, the wiper pole $32a$ is connected to the voltage potential $V_B$ and the wiper pole $32b$ is connected to ground.

The wiper pole $32b$ of the control switch 30 is connected to the junction formed by the cathode of a diode 34 and a resistor 36. A resistor 44 is connected between the other end of resistor 36 and the anode of diode 34. A capacitor 42 is connected between ground and the junction formed by the connection between resistor 44 and diode 34.

A bistable flip/flop circuit 50 is provided so as to receive an an input signal from the control switch on its "Clk" (clocking) input terminal. A resistor 46 and a capacitor 48 are connected to the Clk input terminal. The other side of the capacitor 48 is connected to ground and thereby provides a debounce shunt to ground for signals of short duration on the order of less than 20 m sec. This debounce protection prevents erroneous activation of the flip/flop circuit 50 due to transient signals which may be produced by mechanical separation or connection of contacts in the control switch 30.

The other side of the resistor 46 is connected to the junction formed by resistors 36 and 44 and that junction is protected from transient voltages by diode 38. Diode 38 is connected to the voltage regulator circuit at $V_{cc}$ so that high transient voltages which may appear on the line are clamped to the regulated $V_{cc}$ voltage level by Zener diode 18.

The "R" (reset) input terminal of the flip/flop circuit 50 is connected to several points in the circuit so as responsively reset the flip/flop circuit 50 at appropriate times. For instance, the R terminal is connected through a diode 40 to the junction of diode 34, resistor 44 and capacitor 42. The R terminal is also connected to the wiper pole 32a of the control switch 30 through a dropping resistor 35. A diode 37 is connected to protect against transients on the R line and a capacitor 39 is provide to shunt interference to ground. The capacitor 39 provides debounce protection and thereby prevents erroneous reset signals. The R terminal of the flip/flop circuit 50 is also connected to a stall timer circuit 60 that is made up of a resistor 62, a capacitor 68 and diodes 64 and 66. The input to the stall timer circuit 60 is provided by the "Q" output terminal of flip/flop circuit 50 and serves to monitor the duration of the signal appearing at that Q terminal.

A motor relay control circuit 80 is also connected to the Q terminal of the flip/flop circuit 50 so as to respond to the Q terminal in its "SET" condition (a relatively high voltage level state) by energizing motor relay coil CR1. The motor relay coil CR1 is connected between the power source $V_B$ and ground through a power transistor 86. A dropping resistor 82, resistor 83 and capacitor 84 form the biasing network for the transistor 6 so that when the Q terminal of the flip/flop 50 becomes SET, the transistor 86 will switch from its high impedance, nonconducting state to its low impedance, conducting state to thereby energize the coil of the motor relay CR1.

The motor relay CR1 simultaneously controls a normally closed set of contacts $CR1_a$ and a normally open set of contacts $CR1_b$. The normally closed contacts $CR1_a$ are connected between one terminal of the reversible D.C. motor 10 and the wiper pole 32b of the control switch 30. The normally open contacts $CR1_b$ are connected between the same side of the D.C. reversible motor 10 and a source of voltage $V_B$.

The embodiment shown includes a stall current relay CR2 connected in series between the normally open contacts $CR1_b$ and the voltage source $V_B$. In this case, a reed relay is provided wherein the normally opened contacts of CR2 are closed by induction when the current flowing through contacts $CR1_b$ and the preselected reed relay coil to the motor 10 reaches a predetermined threshold level that indicates the motor has reached a stall or overloaded condition. The normally opened contacts of CR2 are connected to supply $V_{cc}$ to a stall timer circuit 70, when stall current is detected. Therefore, when stall current is sensed by the reed relay CR2 and its contacts are closed, $V_{cc}$ is supplied to the stall current timer circuit 70. After a predetermined period of time, of continuous detection of stall current, the capacitor 78 will accumulate a sufficient charge through resistor 76 that is detected at the R terminal of the flip/flop circuit 50 to cause reset.

The motor 10, which is mechanically connected to a window drive or similar mechanism (not shown), is capable of being energized in either of two directions determined by the polarity of voltage applied across its terminals. Therefore, when the control switch 30 is actuated to its DOWN position, $V_B$ is applied by the wiper pole 32b through the normally closed contacts $CR1_a$ to one terminal of the motor 10. The other terminal of the motor 10 is connected through wiper pole 32a to ground and is therefore energized to rotate in a first direction which would cause the associated window linkage to lower the associated window. Such energization of the motor 10 will at least continue until the control switch 30 is release or until a conventional thermal overload built into the motor 10 opens to prevent damage to the motor. Actuation of the control switch 30 into the DOWN position also causes the flip/flop 50 to respond to the change in voltage occurring at the wiper pole 32b appearing at its Clk input terminal. In response, the flip/flop circuit 50 switches to its SET state and the Q output level switches from a relatively low to a relatively high state. The switching of the Q output of the flip/flop circuit 50 to a relatively high state causes the motor relay CR1 to be energized and effect an immediate opening of the relay contacts $CR1_a$ and closing of relay contacts $CR1_b$. The effect is to continued providing D.C. power to the motor 10 and lower the associated window.

In the event the control switch 30 is released within a first predetermined time period (in this case approximately 500 m sec.) the motor relay CR1 will stay energized to continue driving the motor until stall current is sensed and the stall current timer circuit 70 causes the flip/flop circuit 50 to be reset. In that instance, where the control switch 30 is momentarily actuated for a period of time that is less than the first predetermined time period, the motor automatically continues to be energized to lower the window to its fully opened position.

Actuation of the control switch 30 to either the UP or DOWN positions, while the flip/flop circuit 50 is in its SET state, causes the flip/flop circuit to change to its RESET state and deenergize the motor relay CR1. Energization of the motor 10 will then continue as long as the control switch 30 remains actuated or the thermal overload opens the circuit.

When the control switch 30 is continuously actuated to its DOWN position for a period of time that exceeds the first predetermined period of time, the capacitor 42 becomes charged to a level through resistor 44 that is sufficient to cause the reset input of the flip/flop circuit 50 to be triggered and cause the flip/flop circuit 50 to assume its RESET state, change the Q output to its relatively low level and deenergize the motor relay CR1. When the control switch 30 is subsequently released, the motor immediately stops. Therefore, it can be seen that either momentary or prolonged actuation of the control switch 30, when the motor 10 is being held energized by the motor relay CR1, will be effective to relieve the hold-on feature of the motor relay CR1.

If the control switch 30 is actuated to its UP position, the positive voltage is communicated through switch wiper pole 32a, and resistor 35 to the reset input of flip/flop 50 so that it will assume its RESET state. The motor relay CR1 is deenergized and the motor 10 will be energized with a voltage of opposite polarity to that applied as described above through the control switch 30 and the closed relay contacts CR1a, and thereby cause the window to be raised towards its closed position until the control switch 30 is released.

It will be apparent that many modifications and variations may be implemented without departing from the scope of the novel concept of this invention. Therefore, it is intended by the appended claims to cover all such modifications and variations which fall within the true spirit and scope of the invention.

We claim:

1. A motor control circuit for energizing a reversible D.C. motor comprising:
    manually actuated switching means connected to a source of a D.C. electrical power for commanding said motor to be energized to operate in one of its two reversible directions;
    means responsive to said manually actuated switching means for applying said source of D.C. electrical power to said motor to rotate said motor in a first direction during and after said switching means is manually actuated for a relatively short period of time that does not exceed a first predetermined time period, for inhibiting said application of said source of D.C. electrical power to said motor when said switching means is subsequently actuated and released, and for applying said source of D.C. electrical power directly to said motor to rotate said motor in said first direction only as long as said switching means is manually actuated to direct the rotation of said motor in said first direction when said period of actuation exceeds said first predetermined time period.

2. A motor control circuit as in claim 1, further including means within said responsive means for monitoring the period of time said source of D.C. electrical power is applied to said motor following said switching means being actuated for said relatively short period of time that is less than said first predetermined time period and for causing said responsive means to inhibit application of said source of D.C. electrical power to said motor when said period of application exceeds a second predetermined period of time.

3. A motor control circuit as in claim 1, wherein said responsive means also functions to allow said source of D.C. electrical power to be applied directly to said motor to rotate said motor in a second direction opposite to said first direction only as long as said switching means is manually actuated to command the rotation of said motor in said second direction.

4. A motor control circuit as in claim 3, further including means within said responsive means for monitoring the period of time said source of D.C. electrical power is applied to said motor following said switching means being actuated for said relatively short period of time that is less than said first predetermined time period and for causing said responsive means to inhibit application of said source of D.C. electrical power to said motor when said period of application exceeds a second predetermined period of time.

5. A motor control circuit as in claim 1, further including means connected to said responsive means to monitor said current flow in said motor following said switching means being actuated for said relatively short period of time that is less than said first predetermined time period and provide a stall current signal to said responsive means when said current flow in said motor exceeds a predetermined level for a third predetermined time period and said responsive means being responsive to said stall current signal to inhibit said application of said source of D.C. electrical power to said motor.

6. A motor control circuit as in claim 3, further including means connected to said responsive means to monitor said current flow in said motor following said switching means being actuated for said relatively short period of time that is less than said first predetermined time period and provide a stall current signal to said responsive means when said current flow in said motor exceeds a predetermined level for a third predetermined time period and said responsive means being responsive to said stall current signal to inhibit said application of said source of D.C. electrical power to said motor.

7. A one-touch down control circuit for controlling the electrical energization of a window drive motor in an automotive vehicle comprising:
    a manually actuated switch means defining an unactuated "OFF" position and separately actuated "UP" and "DOWN" positions;
    means connected between said switch means and said motor for automatically energizing said motor to drive said window in its downward direction when and after said switch means is actuated to its "DOWN" position for a time period that does not exceed a first predetermined period of time and for deenergizing said automatically energized motor after said switch means is subsequently actuated and returned to its "OFF" position; and
    means connected to said energizing means for sensing current levels in said motor and to cause said energizing means to deenergize said automatically energized motor when said current level in said motor exceeds a predetermined level for a second predetermined period of time.

8. A circuit as in claim 7, wherein said energizing means further includes means for monitoring a period of time said motor is automatically energized to drive said window in its downward direction and for causing said energizing means to automatically deenergize said motor when said period of time said motor is automatically energized exceeds a third predetermined period of time.

9. A motor control circuit for energizing a reversible D.C. motor comprising:
    a source of D.C. energy;
    switching means being manually actuable to control the direction of rotation of said motor through the application of D.C. energy from said source to selected terminals of said motor;
    circuit means connected to said switching means, said source and said motor for responsively applying energy from said source to said motor when said switching means is actuated to control the rotation of said motor in a first predetermined direction and the duration of actuation is less than a first predetermined period of time and continuing said application for a second period of time that extends past said first predetermined period of time;

said circuit means also being responsive to subsequent actuation and release of said switching means during said second period of time to deenergize said motor and responsive to the actuation of said switching means for a duration longer than said first predetermined period of time to apply energy from said source to said motor only for said longer duration.

* * * * *